Patented Feb. 7, 1939

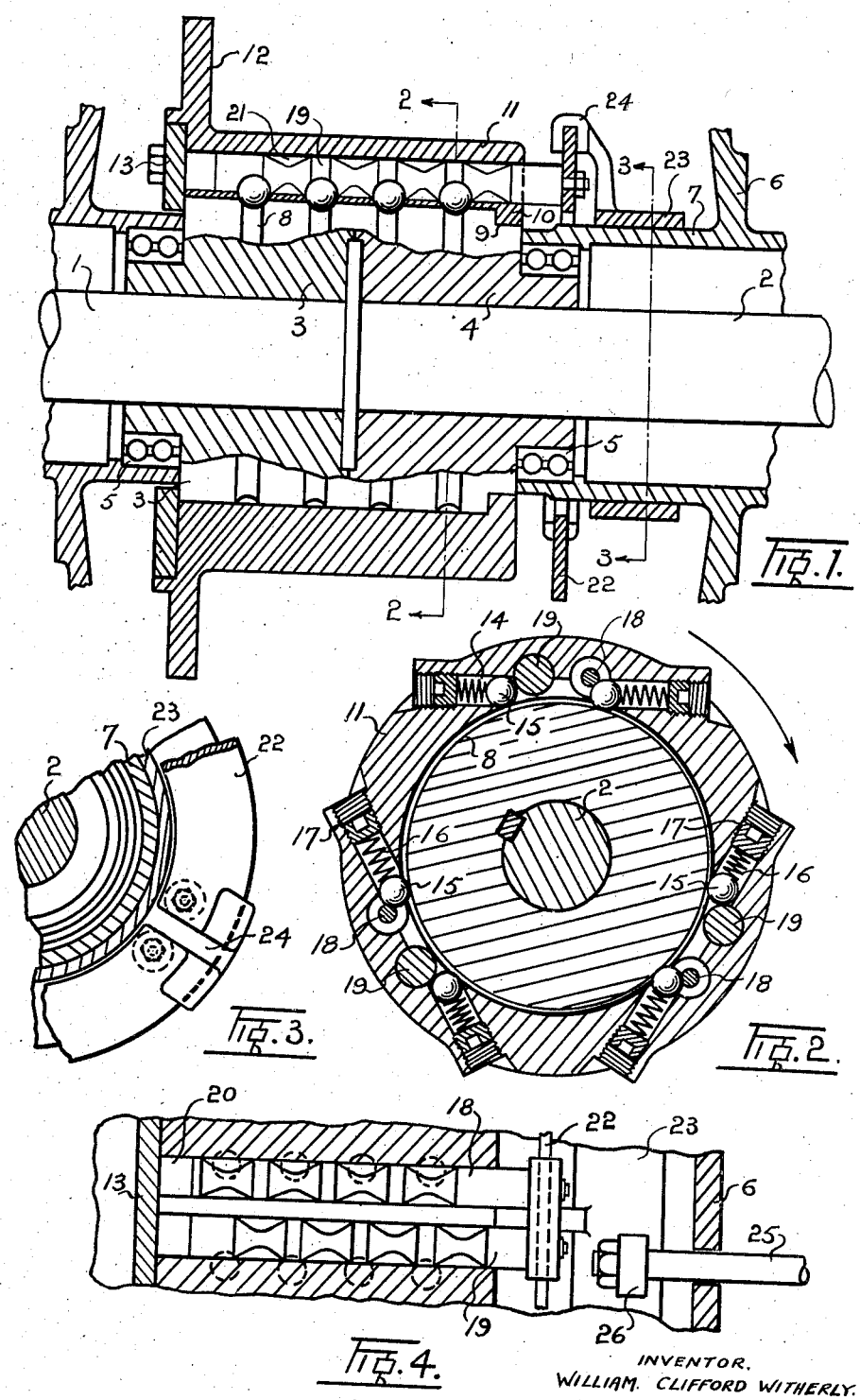

2,146,165

UNITED STATES PATENT OFFICE 2,146,165

DIFFERENTIAL

William Clifford Witherly, Vancouver,
British Columbia, Canada

Application November 15, 1937, Serial No. 174,574
In Great Britain December 4, 1936

5 Claims. (Cl. 74—389.5)

My invention relates to improvements in differentials which are particularly adapted for use in motor driven vehicles.

The objects of the invention are to provide a differential having two clutch elements capable of being set to pick up their load in either direction; to provide a simple axial movement for reversing the direction of pick up of the load, and to provide a small and compact structure capable of withstanding heavy power loads.

The invention consists essentially of a pair of aligned shafts which are each fitted at their adjoining ends with a boss and are driven through balls or rollers from a driven sleeve, said driven sleeve being provided with chordial passages in which the balls or rollers are adapted to move towards and away from driving position, said sleeve having a longitudinally movable member adapted to engage the balls or rollers to permit driving rotation of each shaft in one direction and to prevent driving rotation of the shafts in the opposite direction, as will be more fully described in the following specification and shown in the accompanying drawing, in which:—

Fig. 1 is a longitudinal sectional view of the invention.

Fig. 2 is a transverse sectional view taken on the line 2—2 of Figure 1.

Fig. 3 is a fractional sectional view taken on the line 3—3 of Figure 1.

Fig. 4 is a longitudinal sectional view taken through the control rod passages.

In the drawing like characters of reference indicate corresponding parts in each figure.

The numerals 1 and 2 indicate aligned shafts which are fitted respective with bosses 3 and 4. The bosses are journalled in suitable bearings 5 in a differential housing 6, one end of the differential housing is provided with a circular bearing 7, the purpose of which will hereinafter appear. Each of the bosses are provided with one or more peripheral grooves 8 and the boss 4 is provided with a rebate 9 at its outer end forming a stop for an internal flange 10 on a sleeve 11, which sleeve is rotatably mounted upon the bosses 3 and 4.

The sleeve 11 is provided at one end with an external flange 12 for the purpose of receiving a crown gear, not shown. The sleeve 11 is held in position by an annular flange 13 which is secured to the end of the sleeve by any appropriate means. A plurality of chordial passages 14 are formed at tangents to the sleeve 11, which intersect the inner periphery of the sleeve. The passages are each fitted with two balls or rollers 15 which are urged towards the centre by light springs 16 abutting plugs 17 which are screwed into the ends of the passages. The balls 15 are adapted to ride, when in engaging position, in the peripheral grooves 8 of the bosses 3 and 4.

In the preferred form of the device, as herein shown, pairs of rods 18 and 19 are slidably mounted in passages 20 extending longitudinally of the sleeve. These rods are provided with grooves or notches 21 spaced to correspond with the spacing of the grooves 8 and the balls 15, but the notches of the rods 18 are staggered with respect to the notches of the rods 19 as shown in Figure 4. Each pair of rods 18 and 19 are secured at their outer ends to an annular ring 22 which is moved endwise by a collar 23 having claws 24 in which the annular ring is rotatable. The collar 23 is slidably mounted upon the circular bearing 7 and is moved endwise by any suitable mechanism through one or more rods 25 extending through the end wall of the differential housing 6 and secured to lugs 26 formed upon the collar.

As a matter of convenience in manufacture, the control of the balls or rollers 15 is effected through pairs of rods 18 and 19.

In operating the differential, the collar 23 will normally be set to drive in a forward direction or in the direction of the arrow shown in Figure 2. When in this position, the notches of the rods 18 register with the grooves 8, so that the balls 15 are free to advance, in response to the drive or the action of the springs 16, into said notches and into wedging position between the grooves 8 and the outer walls of the chordal passages 14, so that the rotation of the sleeve 11 will communicate its drive through the balls to the bosses 3 and 4. The rods 19 have their notches out of register with the grooves 8, so that the balls contacting said rods will be held back in the passages 14 by the peripheral portions of the rods which lie between said notches, these balls therefore will be kept out of action.

Obviously when the vehicle is turning, the drive will be on the inside wheel and the outside wheel and axle will overrun the drive, since the overrun of the outer boss will urge the balls adjacent the rods 18 back against their springs 16.

To reverse the drive, it suffices to thrust the collar 23 to the left, see Figure 4, when the balls adjacent the rods 19 will be allowed to come into action and those adjacent the rods 18 will be moved out of action.

What I claim as my invention is:

1. A differential comprising a pair of bosses adapted for connection to a pair of aligned shafts, a driving sleeve surrounding the bosses, said sleeve having chordal passages intersecting the inner periphery of the sleeve and the outer periphery of the bosses, two rotatable elements within each of the passages adapted to engage the corresponding boss to transmit the drive from the sleeve to each of the bosses, and means for moving one element of each passage out of engaging position between the sleeve and its boss and to permit the movement of the other rotatable element into engaging position, and means for urging the rotatable elements into engaging position.

2. A differential comprising a pair of bosses adapted for connection to a pair of aligned shafts, a driving sleeve surrounding the bosses, said sleeve having chordal passages intersecting the inner periphery of the sleeve and the outer periphery of the bosses, two rotatable elements within each of the passages adapted to engage the corresponding boss to transmit the drive from the sleeve to each of the bosses, and means for moving one element of each passage out of engaging position between the sleeve and its boss and to permit the movement of the other rotatable element into engaging position, said element moving means consisting of an endwise movable member disposed between said elements and having notches on opposite sides, said notches being so placed that as one element is moved out of a notch on one side of the member the other element is free to move into a notch on the opposite side of the member.

3. A differential comprising a pair of bosses adapted for connection to a pair of aligned shafts, a driving sleeve surrounding the bosses, said sleeve having chordal passages intersecting the inner periphery of the sleeve and the outer periphery of the bosses, two rotatable elements within each of the passages adapted to engage the corresponding boss to transmit the drive from the sleeve to each of the bosses, and means for moving one element of each passage out of engaging position between the sleeve and its boss and to permit the movement of the other rotatable element into engaging position, said bosses being provided with peripheral grooves in which the rotatable elements are adapted to track.

4. A differential comprising a pair of bosses adapted for connection to a pair of aligned shafts, a driving sleeve surrounding the bosses, said sleeve having chordal passages intersecting the inner periphery of the sleeve and the outer periphery of the bosses, two rotatable elements within each of the passages adapted to engage the corresponding boss to transmit the drive from the sleeve to each of the bosses, and means for moving one element of each passage out of engaging position between the sleeve and its boss and to permit the movement of the other rotatable element into engaging position, and an annular ring concentric to the bosses engaged by the element moving means, and means for imparting endwise movement to the annular ring.

5. A differential comprising a pair of bosses adapted for connection to a pair of aligned shafts, a driving sleeve surrounding the bosses, said sleeve having chordal passages intersecting the inner periphery of the sleeve and the outer periphery of the bosses, two rotatable elements within each of the passages adapted to engage the corresponding boss to transmit the drive from the sleeve to each of the bosses, an endwise movable member disposed between each pair of rotatable elements for moving one of said elements out of engaging position and to permit the other to move into engaging position, an annular ring concentric to the bosses to which the endwise movable member is connected and a concentrically mounted clawed collar engaging the ring for imparting movement to the endwise movable member.

WILLIAM CLIFFORD WITHERLY.